(No Model.) 2 Sheets—Sheet 1.

A. C. McCORD.
CAR COUPLING.

No. 489,492. Patented Jan. 10, 1893.

Witnesses,
Emma F. Elmore
A. H. Opsahl

Inventor,
Alvin C. McCord
By his Attorney,
Jas. F. Williamson (No Model.) 2 Sheets—Sheet 2.

A. C. McCORD.
CAR COUPLING.

No. 489,492. Patented Jan. 10, 1893.

Witnesses.
Emma F. Elmore
A. W. Opsahl.

Inventor.
Alvin C. McCord
By his Attorney.
Jas. F. Williamson

UNITED STATES PATENT OFFICE.

ALVIN CARR McCORD, OF CHICAGO, ILLINOIS.

CAR-COUPLING.

SPECIFICATION forming part of Letters Patent No. 489,492, dated January 10, 1893.
Application filed February 18, 1892. Serial No. 422,006. (No model.)

*To all whom it may concern:*

Be it known that I, ALVIN CARR MCCORD, a citizen of the United States, residing at Chicago, in the county of Cook and State of Illinois, have invented certain new and useful Improvements in Automatic Car-Couplers; and I do hereby declare the following to be a full, clear, and exact description of the invention, such as will enable others skilled in the art to which it appertains to make and use the same.

My invention relates to automatic car-couplers; and is in the nature of further improvement in the line of invention set forth and described in my former patent No. 454,406, issued to me of date June 16, 1891; and in my pending application Serial No. 392,361, filed May 11, 1891.

In my coupler, as shown in the said patent and application, I employ a releasing rod for disengaging the locking dog and opening the coupling-hook, the connections being such that the initial pull on the rod will release the dog and that a continued pull will open the coupling hook, if the same be unopposed or without strain from the adjacent car. I also provided, as shown in the said application, a detaining device applicable to the releasing rod, so as to permit the dog to be set in its unlocked position, when the cars were coupled and be again tripped into its normal position by the opening movement of the coupling hook.

The principal feature of improvement consists in a safety trip provided for the releasing device, so arranged as to trip the same and unlock the dog in case the draw-bar should in any way become displaced, thereby uncoupling the cars and preventing the draw-bar from falling to the track. Danger from this source is thereby avoided.

Another feature consists in a yielding connection interposed between some two parts of the releasing device, which more readily permits the same to be properly controlled by the retaining device to set the dog in its unlocked position.

Other features will appear in the detailed description and be defined in the claims.

The inventions are illustrated in the accompanying drawings. Therein like letters referring to like parts throughout;—

Figure 1:
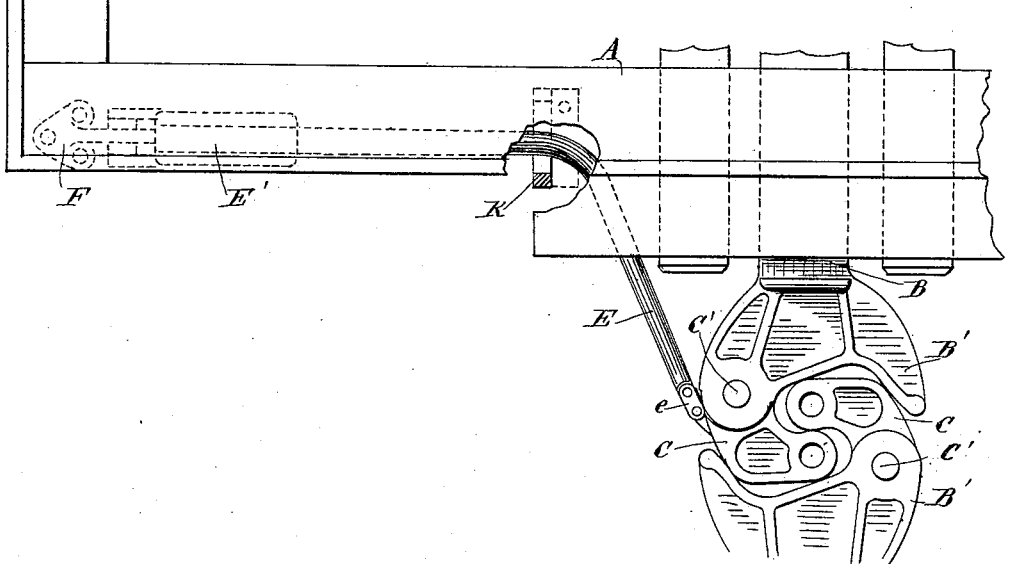
Figure 2:
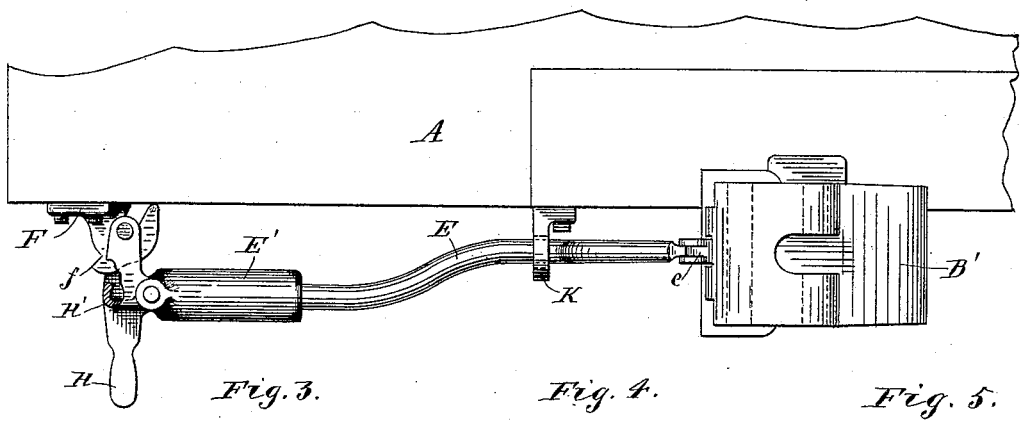
Figures 3, 4, 5:
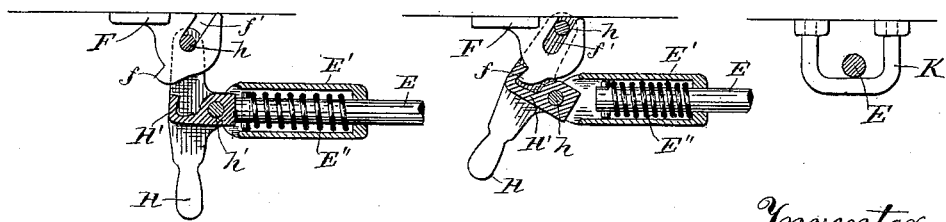
Figure 6:
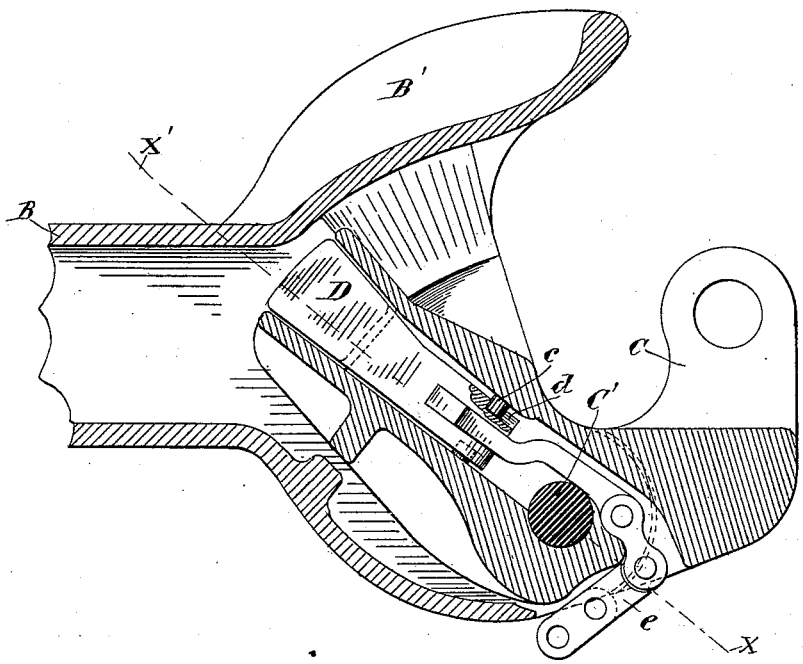
Figure 7:
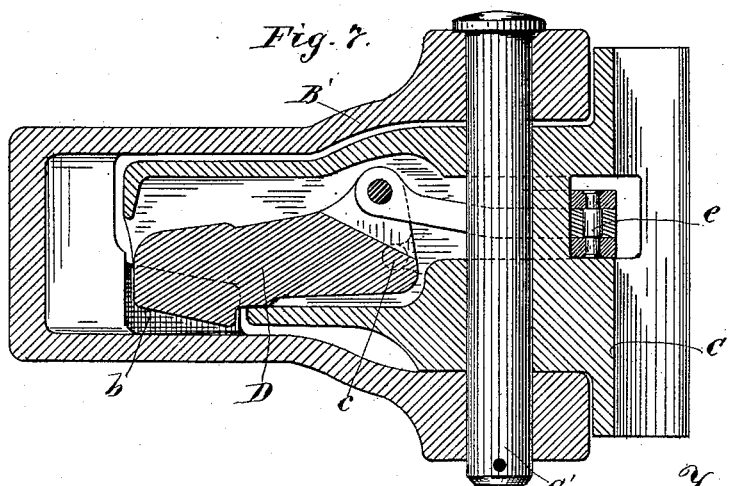

Figure 1 is a plan view and Fig. 2 a front elevation of my improved coupler in working position, some parts being broken away. Figs. 3 and 4 are details in sectional elevation, illustrating the yielding connection between two parts of the releasing device, and showing the application of the retaining device. Fig. 5 is a detail, in side elevation, showing the safety trip. Fig. 6 is a horizontal section taken through the coupling head and the coupling-hook; and Fig. 7 is a vertical section on the line X X' of Fig. 6.

A represents part of the car-body.

B B' are the draw-bar and coupler-head, and C the coupling-hook having a recessed heel-piece. The coupling-hook with recessed heel-piece is substantially like that in my former patent and application, except that it is provided on the inner walls of its recess with a pair of pivot-studs $c$.

D is the locking-dog seated in the recess of the coupling-hook and provided at its forward end with notches or pivot stud seats $d$, which engage with the pivot stud $c$ and co-operate therewith to form a fulcrum for the locking-dog. The dog locks by gravity, its free end being enlarged and working through an opening in the lower face of the heel-piece and engaging, when in its locked position, behind a locking lug $b$, on the inner surface of the coupling-head.

E E' is a sectional releasing rod connected at its inner end by link sections $e$, working through an opening in the coupling hook and connected to the upper corner or edge of the locking-dog. The said link connections pass behind the pivot-bolt C', which connects the coupling-hook with the coupling-head and is thereby held, together with the locking-dog, from displacement. The two sections E E' of the releasing rod, are, as shown, constructed to telescope with each other and are yieldingly united by a coiled spring E''.

F is the lock-plate secured to the sill of the car near the side of the same, and is provided with the latch-shoulder $f$ and a slot $f'$.

H is the hand-lever for operating the releasing device suspended by the tie bolt $h$, working in the slot of the lock-plate and pivotally connected, preferably at some point near its center with the section E' of the releasing rod. This pivotal connection is shown at $h'$. The hand-lever H carries a latch H' adapted to engage with the latching shoulder $f$ of the lock-plate F.

The operation of this hand lever and retaining device is obvious from an inspection of Figs. 3 and 4. Suppose the coupling-parts to be in their closed and coupled position, as shown in Fig. 1. Then by throwing the hand-lever H into the position shown in Fig. 4, the locking-dog will be tilted on its fulcrum thereby releasing the coupling parts and permitting the coupling-hook to open under the forward movement of the car. This opening movement of the coupling-hook will cause the section E of the releasing-rod to strike the upper corner of the rear end of the latch H', thereby positively disengaging the same from the latch shoulder $f$ on the plate F, permitting the said lever and the parts of the releasing rod to resume their normal positions. The yielding connection between some two parts, as E E' of the releasing device, effected as shown by the spring E'' is a material advantage, inasmuch as it enables the releasing device to be set and held by the retaining device under tension, when the coupling-hook is closed, so as to hold the locking-dog in its unlocked position. Without the yielding connection the perfect co-operation of the retaining device with the releasing device could not be secured. The positive disengagement of the latch H' from the plate F is also an important advantage over my former constructions.

K is the safety trip for the releasing device and consists, as shown, of a stirrup secured to the sill of the car, through which the inner section E of the releasing-rod is passed. It is evident that this stirrup will prevent the forward motion of the rod E and will also prevent the same from lowering with respect to the car-body. Hence, it is obvious that if the draw-bar should become torn loose from its connection with the car-body, that upon its initial forward movement under the strain from the next forward car the releasing rod E would be intercepted and stopped by the stirrup K, thus releasing the locking-dog and permitting the coupling parts to open. The draw-bar would therefore not be entirely withdrawn from the car and an accident from that cause could not occur. In other words, with this device the draw-bar is prevented from falling onto the track, and the lame car is disengaged from the train. This is an important improvement. Accidents have hitherto been frequently caused by the breakage and withdrawal of the draw-bars. With my device, no harm can come even if the drawbar should be broken or in any way become disconnected from the car.

The advantage of the pivot studs in the heel of the coupling-hook and corresponding stud-seats on the forward end of the locking dog, as compared with my former construction, is, that thereby all danger of any sliding or cramping action, under the movement of the releasing-rod, is avoided on the part of the locking dog.

What I claim and desire to secure by Letters Patent of the United States, is as follows:—

1. In an automatic car-coupler, the combination with the coupler head provided with a locking-lug of the coupling hook having a recessed heel-piece and a pair of pivot studs projecting from the walls of the recess, of the locking dog, for engaging said lug, seated in the recess of the said heel-piece and provided with notches or stud seats at its forward end engaging with said pivot studs and constituting the fulcrum for the dog, substantially as and for the purpose set forth.

2. In an automatic car coupler, the combination with the draw-bar and a locking device for the coupling parts, of a releasing device for unlocking the coupling parts and a safety trip arranged to operate the releasing device upon the displacement of the draw-bar, thereby uncoupling the cars, and preventing the draw bar from falling onto the track.

3. In an automatic car-coupler, the combination with the draw bar and the coupling parts of a locking device, for securing the said parts in their coupled position, a releasing rod connected to said locking device and extending outward to a point near the side of the car, and a safety holder and trip for the releasing rod, adapted to intercept the forward and downward motion of the same, whereby, if the draw-bar should become displaced, the cars will be uncoupled and the draw-bar be prevented from falling onto the track, substantially as described.

4. The combination with the draw-bar and coupler-head B B', of the coupling-hook C, the locking dog D, the releasing rod connected with the dog through a perforation in the coupling-hook located in advance of its pivot, and the stirrup K secured to the car-body and serving as a safety holder and trip for the releasing rod, substantially as and for the purpose set forth.

5. In a twin-jaw automatic car coupler, the combination with the coupling parts and an automatic locking device, of a releasing device constructed in two or more parts having a yielding connection with each other and a retaining device for the releasing device adapted to hold the locking device in its unlocked position and to be tripped by the opening movement of the coupling parts.

6. In an automatic car-coupler, the combination with the locking device for the coupling parts, of the sectional releasing rod E E′, the spring E″ uniting the sections E E′ the lock-plate F, provided with the latch shoulder $f$, and the slot $f'$, the hand-lever H suspended from the slot $f'$ and pivotally connected to the section E and the latch H′ carried by the lever H, the said parts being arranged and operating, substantially as and for the purposes set forth.

In testimony whereof I affix my signature in presence of two witnesses.

ALVIN CARR McCORD.

Witnesses:
 JOHN KEHOE,
 CHAS. H. KING.